United States Patent [19]

Turetsky

[11] 4,211,660

[45] Jul. 8, 1980

[54] FILTER-PURIFIER CARTRIDGE

[76] Inventor: Isadore Turetsky, 23940 Welby Way, Canoga Park, Calif. 91307

[21] Appl. No.: 24,156

[22] Filed: Mar. 26, 1979

[51] Int. Cl.² .............................................. B01D 29/26
[52] U.S. Cl. ..................................... 210/315; 210/458
[58] Field of Search .............. 210/295, 315, 335, 337, 210/338, 339, 450, 458

[56] References Cited

U.S. PATENT DOCUMENTS

| | | | |
|---|---|---|---|
| 2,781,912 | 2/1957 | Newcum ............................. | 210/295 |
| 3,132,501 | 5/1964 | Jacobs et al. .................. | 210/295 UX |
| 3,262,565 | 7/1966 | Silverwater ..................... | 210/315 X |
| 3,357,563 | 12/1967 | Sicard ............................... | 210/315 X |
| 3,455,459 | 7/1969 | Troy ................................... | 210/315 |

Primary Examiner—William A. Cuchlinski, Jr.

[57] ABSTRACT

A filter-purifier cartridge arranged so that a purifier element is inserted into the hollow core of a tubular filter element, said filter element joined to a cartridge end closure; the inlet and outlet passages of the purifier element arranged to permit axial flow through its hollow core containing the purifying medium, in combination with radial flow through the tubular filter element; said cartridge being capable of manual assembly and separation of said elements.

7 Claims, 2 Drawing Figures

FILTER-PURIFIER CARTRIDGE

FIELD OF THE INVENTION

This invention relates to a filter-purifier cartridge, and since it finds particular utility in the field of water filtration and purification, embodiments hereinafter described as illustrative of the invention and the advantages thereof are understood to be not restricted to such use.

There is a growing demand for an inexpensive filter element that can be periodically discarded, in combination with an economical purifying element. Both the efficiency and life of a combined filter and purifier cartridge depend on the quantity of purifying medium used and the surface area of the filter. In present types of filter-purifier cartridges the fluid does not flow uniformly through the purifying medium, whereas in an axial flow assembly the relatively small surface area of the filter decreases the life expectancy of the cartridge.

OBJECTS OF THE INVENTION

An object of my invention is to provide a filter-purifier cartridge consisting of manually separable filter and purifier elements which can be removed when efficiency is impaired and replaced by a new cartridge.

Another object of my invention is the provision for manual removal of an impaired filter element and placing of a new filter element. In addition, the provision for changing the purifying medium within the purifier element for new purifying medium, resulting in a marked savings as compared to a throw away unit.

Another object of my invention is to combine the efficiency offered by radial flow through the walls of the filter element with an axial flow through the purifier element.

Embodiments of my invention capable of accomplishing the foregoing objects and providing the advantages contemplated by them and other advantages will become more apparent after studying the detailed description of the following specification which may be readily understood by reference to the accompanying drawings.

DETAILED DESCRIPTION OF THE DRAWINGS

Figure 1:
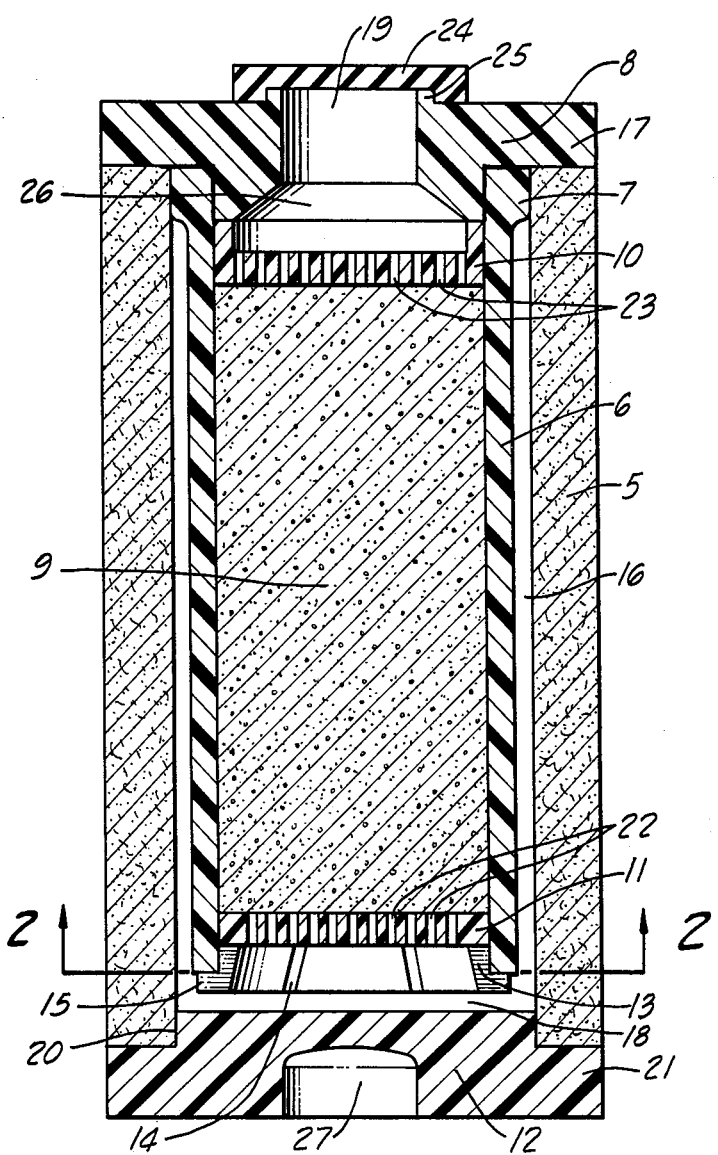
FIG. 1 is a side elevation sectional view of the filter-purifier cartridge of my invention.
Figure 2:
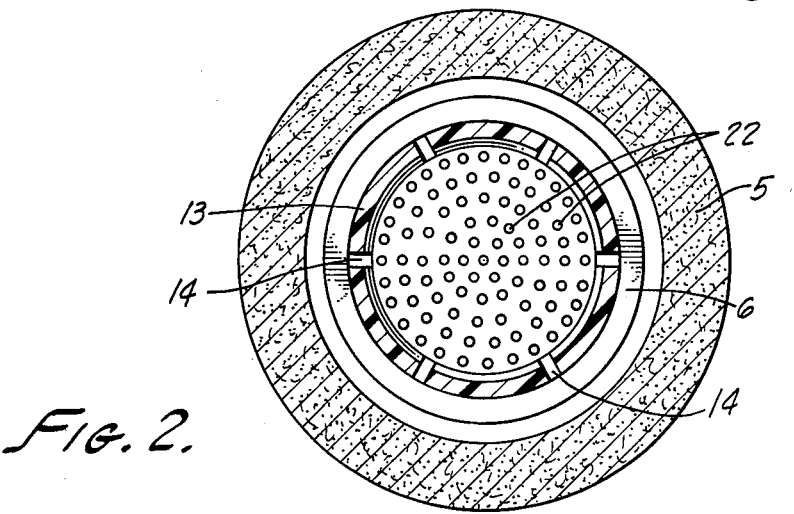
FIG. 2 is a transverse sectional view taken along line 2—2 of FIG. 1.

Referring to FIG. 1 which is for illustrative purposes only, the numberal 5 indicates a permeable porous tubular filter element having a hollow core and a cartridge end closure 12 joined to its lower end section; said tubular filter 5 being perferably but not essentially, a rigid structure. The hollow cylinder 6 of the purifier element has a collar 7 at its upper end section, and a cartridge top wall 8 joined to said upper end section. The cartridge top wall 8 is preferably but not necessarily bonded to the hollow cylinder 6 as shown. A concentric discharge passage 19 through the top wall 8 communicates with the fluid stream within the purifier element. The purifying medium 9 is confined within the hollow cylinder 6 of the purifier element by means of the perforated cup 10 and perforated cup 11. The upper perforated cup 10 has an optional loose sliding fit within cylinder 6 thereby facilitating manual removal and insertion of said cup. The skirt 13 of the lower perforated cup 11 has a sliding frictional fit within the hollow cylinder 6; the optional slots 14 in said skirt 13 increase the flexibility of said skirt and facilitate manual removal and insertion of the perforated cup 11. The slots 14 also serve a second function to be described later. A flange 15 of the perforated cup 11 rests against the end wall at the inlet end section of hollow cylinder 6 and limits the depth of insertion of said cup 11 within said hollow cylinder 6. It will be obvious to one skilled in the art that the lower perforated member within hollow cylinder 6 can be adapted for insertion by threaded means. The sliding frictional fit of skirt 13 makes the purifier element self contained when said purifier element is removed from the cartridge, as purifying medium 9 will not discharge from the purifier element until said cup 11 is removed. The hollow cylinder 6 of the assembled purifier element is inserted into the hollow core of the tubular filter 5, and maintained in spaced relationship with the sidewall of said tubular filter 5 by means of collar 7 which in inserted into and joined to the upper end section of said tubular filter, thereby forming annular channel 16 between the sidewalls of cylinder 6 and tubular filter element 5. The upper end wall of tubular filter 5 rests against the top wall flange 17 which adjoins collar 7, and keeps the end wall of the inlet end section of the purifier element in a spaced relationship with the inside end wall of cartridge end closure 12 to form a clear space 18 which communicates directly with the annular channel 16. The flange 21 of cartridge end closure 12 which adjoins the collar 20 of said end closure, rests against and seals the lower end wall of tubular filter 5, said collar 20 inserted into and joined to the lower end section of tubular filter 5. The fluid stream within the purifier element communicates with clear space 18 via the perforations 22 in cup 11. Should cup 11 fall and rest against the inside end wall of cartridge end closure 12 fluid will continue to flow from the annular passage 16 and through the purifier element via slots 14 in cup skirt 13. One skilled in the art can obviate the use of cup 11 by extending the hollow cylinder 6 so that the purifying medium 9 within said hollow cylinder 6 is confined by the inside end wall of cartridge end closure 12; an optionally slotted or perforated inlet end section of cylinder 6 can be used to maintain the needed area for fluid flow into the purifier element. A ring gasket 24 is disposed atop the cartridge top wall 8 and surrounds the discharge passage 19 of the filter-purifier cartridge, said gasket 24 being positioned by the ring projection 25 of top wall 8. The fluid stream within the purifier element communicates with the discharge passage 19 by means of perforations 23 in cup 10 and chamber 26 intermediate said discharge passage and said perforated cup 10. The concentric recess 27 in the cartridge end closure 12 can be used to align the cartridge in its housing.

In operation the filter-purifier cartridge as shown is subjected to axial compression after the cartridge is inserted in its housing. The cartridge housing is not part of my invention and is not illustrated. It will be evident that, while the filter housing is not shown, one skilled in the art can easily adapt the illustrated cartridge to a hollow cylindrical housing having axially aligned inlet and outlet passages. One skilled in the art will also note that embodiments of the cartridge as shown are adapted to a common type of filter housing which is screwed onto a double ported end section containing an "O" ring to seal the single open end of said housing.

With the filter-purifier cartridge assembled as illustrated, fluid to be filtered and purified flows radially through the permeable porous walls of tubular filter 5 and enters the annular channel 16. The fluid then flows into clear space 18 and thence into the hollow core of cylinder 6 via perforations 22 in cup 11. The fluid flows through the hollow core of cylinder 6 wherein the purifying medium 9 is contained, and enters chamber 26 via perforations 23 in cup 10. The fluid then exits through the discharge passage 19, said discharge passage communicating with the discharge passage of the cartridge housing. The ring gasket 24 surrounding the cartridge discharge passage 19 and the cartridge housing discharge passage prevents unprocessed fluid from being discharged through said cartridge housing discharge passage.

The present invention contemplates alternate embodiments which can include a fiber winding on a reticulated or perforated core as a tubular filter element. A pleated resin impregnated filter paper formed around a perforated core can be used as a filter element. Also, a removable permeable sheath can be wound around a pervious tubular filter element, said element having an optional integral cartridge end closure. In addition the hollow cylinder 6 can be joined to the tubular filter element by threaded means.

While the embodiments of this invention hereinbefore illustrated and described are fully capable of performing the objects and accomplishing the advantages primarily stated, it will be understood that this invention is not restricted to the specific embodiments hereinbefore set forth, but includes all modifications coming within the scope of the claims that follow.

I claim:

1. A filter-purifier cartridge for liquids having manually separable and assembled elements and adapted to be inserted in a filter apparatus, comprising: a self-contained purifier element having inlet and outlet means for flow of fluid therethrough, said purifier element being assembled and disassembled by manual means, and having an integral top wall, an integral collar and external flange at the upper end section of its hollow cylinder, inlet means at the lower end section of said hollow cylinder, a concentric discharge passage through said top wall, and purifying medium confined between two foraminous members within said hollow cylinder, the fluid stream within said purifier element communicating with the concentric discharge passage through said top wall; said hollow purifier cylinder and integral collar inserted into a tubular filter element having a manually separable cartridge end closure joined to its lower end section, the upper end section of said tubular filter joined to said integral collar, said collar maintaining the tubular filter in spaced relationship with said purifier cylinder to form an annular channel intermediate their sidewalls, said annular channel communicating with the inlet of said purifier element.

2. The invention defined in claim 1, in which a frictional seal surrounds the discharge passage through said top wall.

3. The invention defined in claim 1, wherein a chamber exists intermediate the discharge passage through said top wall and that foraminous member nearest said discharge passage within the purifier element.

4. The invention defined in claim 1, in which the upper end of said tubular filter rests against the external flange of said purifier element.

5. The invention defined in claim 1, in which said cartridge end closure has a concentric recess in its exposed end.

6. The invention defined in claim 1, in which the lower foraminous member within said purifier element has a slotted skirt.

7. A filter-purifier cartridge for liquids having manually separable and assembled elements and adapted to be inserted in a filter apparatus, comprising: a self-contained purifier element having inlet and outlet means for flow of fluid therethrough, said purifier element being assembled and disassembled by manual means, and having an integral top wall, an integral collar and external flange at the upper end section of its hollow cylinder, inlet means at the lower end section of said hollow cylinder, a concentric discharge passage through said top wall, and purifying medium confined between two foraminous members within said hollow cylinder, the fluid stream within said purifier element communicating with the concentric discharge passage through said top wall; said hollow purifier cylinder and integral collar inserted into a tubular filter element having a manually separable cartridge end closure joined to its lower end section, the upper end section of said tubular filter joined to said integral collar, said collar maintaining the tubular filter in spaced relationship with said purifier cylinder to form an annular channel intermediate their sidewalls, said annular channel communicating with the inlet of said purifier element by means of a clear space between that entire area of the lower end of said purifier element facing the lower cartridge end closure, and said cartridge end closure.

* * * * *